ABSTRACT OF THE DISCLOSURE

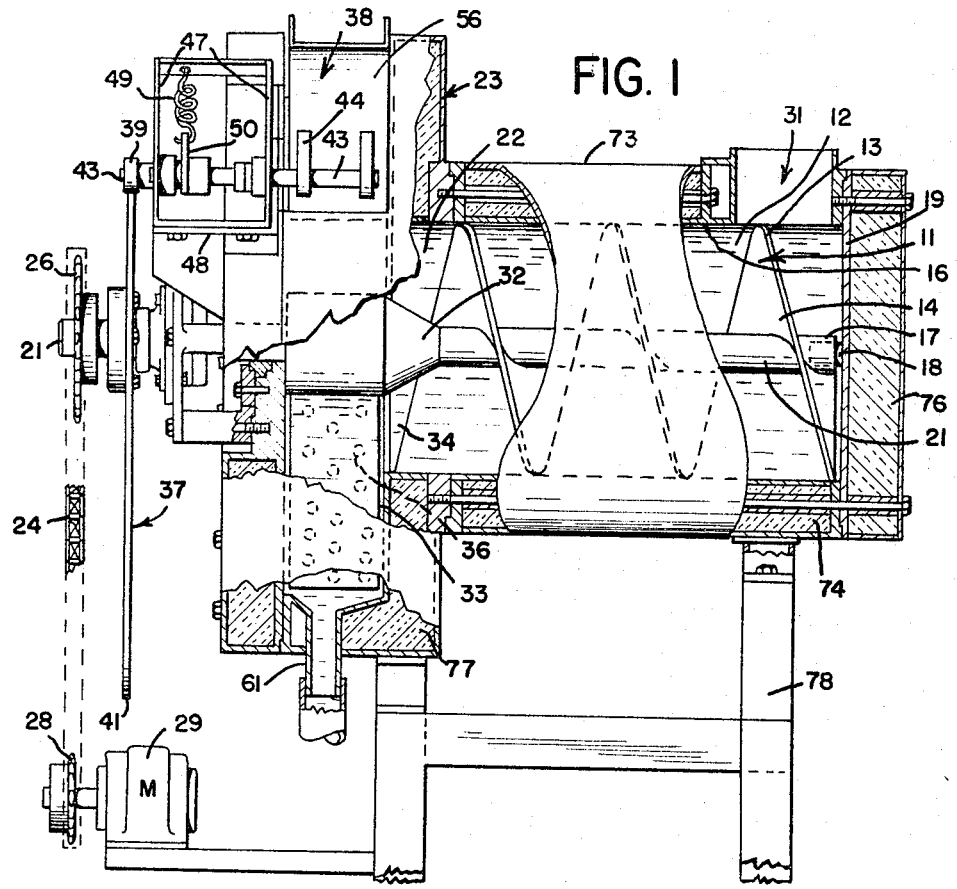

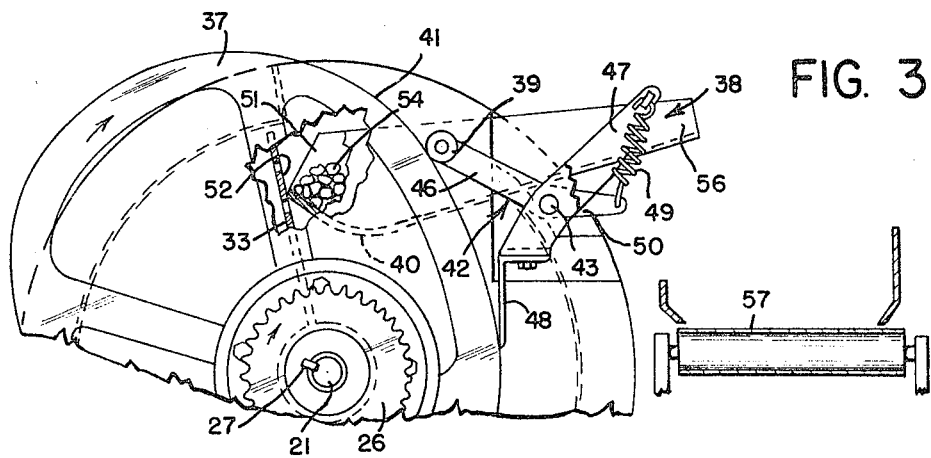
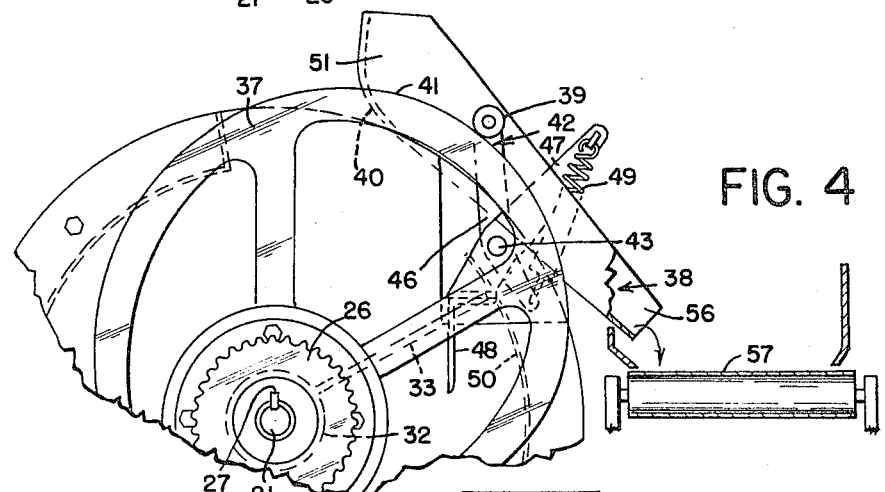
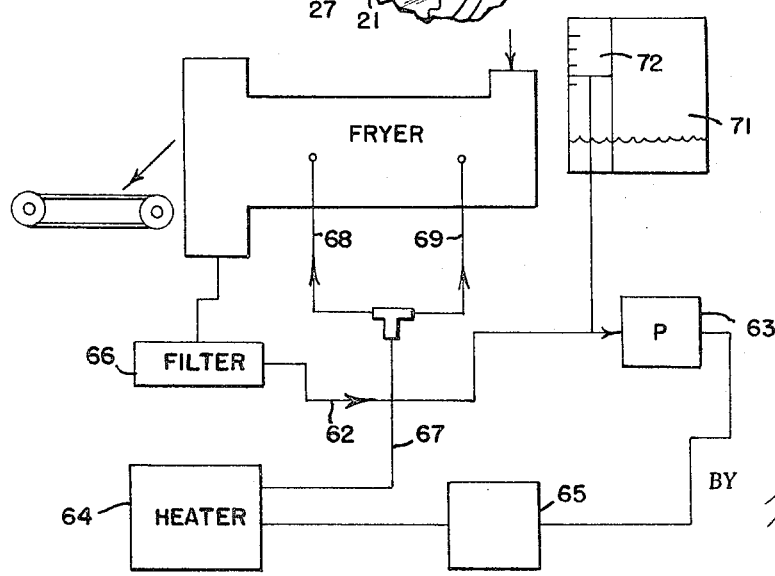
INVENTORS
JOHN O. BENSON
CLIFTON MORRISON
BY Harold O. Jastrow
ATTORNEY 3,380,375
CONTINUOUS DEEP FAT FRYER
John O. Benson, Mayer, and Clifton Morrison, St. Paul, Minn., assignors to General Mills, Inc., a corporation of Delaware
Filed Aug. 1, 1967, Ser. No. 657,565
7 Claims. (Cl. 99—404)

A continuous deep fat fryer utilizing an auger completely enclosed in a cylindrical chamber which is filled with cooking oil. The auger carries food products from an input end to an output end at a predetermined rate of movement and also provides agitation of the product and insures complete immersion of the food product in the cylindrical chamber. The product is removed from the cooking oil by a paddle attached to the last lead of the auger. The auger cooperates with a cam operated jam free scoop to discharge the product after each revolution of the auger.

Background of invention

Deep fat fryers are well known to the potato chip industry and to other food industries which produce fat fried food products. In the past, these deep fat fryers have generally been of two types. First, there is the batch fryer in which a given quantity of material such as unprocessed potato slices is deposited and deep fat fried for a predetermined length of time. The deep fat fried potatoes are then unloaded from the machine after which a new batch of potatoes is introduced into the oil. This type of machine in which a single batch of product is cooked is inconvenient and does not lend itself to quantity production of high quality products. The reason for the lack of quality control and convenience is illustrated by the fact that the first batch of product put into the fresh oil will be of higher quality tastewise than a subsequent batch of food product.

This lowering of the quality of the food product after a number of batches have been fried in the same cooking oil, results from deterioration of the cooking oil due to heat, oxidation and the like and also due to contamination of the oil by small particles of food product which are left in the container or fryer after each subsequent batch is fried. These small food products are over-cooked and contaminate the oil with undesirable flavors. Other undesirable flavors are developed due to oxidized oil and build up of other oil contaminants such as free fatty acids. Consequently, product quality is not uniform in the batch type fryer. Also, as noted, the batch type fryer requires special loading and unloading machinery and constant attention in order to insure even minimal regulation of frying time.

Another type of fryer which is currently used in the potato chip industry is one which contains an open cooking chamber having a quantity of cooking oil which is either directly heated in the cooking pan or in which the frying oil is remotely heated. The heated oil is pumped into the frying pan by suitable conduits. This type of fryer uses a fryer pan which is normally open to the atmosphere and which is frequently quite large. The exposure of the hot cooking oil to the atmosphere results in a large surface area of oil being exposed to the atmosphere thereby permitting oxidation of the oil at a rapid rate. This oxidation is a cause for contaminants in the oil and consequent loss of quality of the fried product.

Another problem encountered with the open pan type fryer is caused by product density. As product fries, it tends to puff and therefore becomes less dense. The less dense product usually floats on the surface of the hot frying oil. When a fried product begins to float, product which is on top of the mass is out of contact with the frying oil and therefore will tend to be understood. Conversely, the product which is beneath the layer of fried material while it is in the cooking oil will be submerged in the oil. In an effort to arrivev at a product of intermediate quality, the frying oil is normally heated to a temperature which will fry the average product at average temperatures in the pan to a near optimum degree. With this attempt to achieve an optimum intermediate product, the material which is beneath this floating layer of product in the pan will be overcooked and that on top will be undercooked. Consequently, there is product at the discharge chute of such a deep fat fryer that is overcooked and there is also some product which is undercooked.

Many and varied methods have been used to overcome this uniformity problem in the open pan fryer. One of the techniques has been to use an elaborate arrangement of paddles. The paddles are attached to a conveyor like mechanism positioned above the cooking oil in the open pan. This conveyor system forces the product into the oil bath and also helps convey the product through the bath. The normal pan type fryer does not have a convenient method of moving products through the bath at a predetermined rate. These conveyors are more or less successful depending upon how well they control the movement of product throughout the frying oil and how well they keep the product submerged in the bath. As might be expected, this type machine involves an elaborate mechanical arrangement and therefore is costly to build, operate and maintain.

It is therefore an object of the present invention to provide a new and improved deep fat fryer which controls the length of time a product is in contact with the frying oil, one which maintains the product in a submerged condition throughout the cooking period and also one which automatically unloads the product from the cooking chamber at the end of a predetermined period of time.

It is a further object of the present invention to provide a new and improved apparatus for continuously deep fat frying a food product under controlled conditions of temperature and for a period of time during which the product is continuously submerged in the frying oil.

It is a further object of the present invention to provide a new and improved deep fat fryer using an auger to submerge the product throughout a frying period and to automatically unload the fried product after a predetermined length of time.

Summary

An apparatus, according to the present invention, includes a cylindrical frying chamber which is filled with a frying oil. The frying chamber is filled to leave a minimum air space. An auger is mounted in the frying chamber with the auger shaft lying coincidental with the central axis of the cylindrical frying chamber. The auger is rotated by a motor and gear system to move product in a submerged condition through the frying oil from an input to an exit of the frying chamber. A paddle is attached to the last lead of the auger and unloads product once for each revolution of the auger. The paddle cooperates with a cam operated scoop which follows the unload cycle of the paddle and discharges the cooked product without jamming from a discharge chamber.

Brief description of the drawings

FIGURE 1 is a front view in partial cross section of a deep fat fryer according to the present invention, FIGURE 2 is a left end view of the deep fat fryer illustrated in FIGURE 1, FIGURE 3 is a fractional view of FIGURE 2 showing the cooperation of a follower and cam with the cam in a different location, FIGURE 4 is a partial view similar to FIGURE 3 showing the cam in the product unload position, and FIGURE 5 is a schematic of the oil circulating system utilized with the deep fat fryer illustrated in FIGURE 1 of the drawings.

*Description of the preferred embodiments*

Refer first to FIGURE 1 of the drawings which illustrates the deep fat fryer according to the present invention. An auger 11 is mounted within a cylindrical frying chamber 12 so that the tops 13 of these auger flights move very closely to the inside wall 16 of the chamber 12. The auger 11 is mounted at one end 17 by a bearing 18 which is rigidly connected to end wall 19 of the cooking chamber. The end 17 of auger shaft 21 may be adapted to accept a bearing of the roller bearing or ball bearing type or it may be designed to function as a friction bearing in cooperation with element 18. Any of these designs are acceptable.

The auger 11 extends from wall 19 of the chamber 12 through the chamber 12 to the discharge end 22 of the chamber. The shaft 21 is coincidental with the central axis of the cylindrical chamber 12.

The shaft 21 of the auger extends beyond the chamber 12 through discharge chamber 23 and terminates at a chain and sprocket drive system illustrated in FIGURE 1 of the drawings. A chain 24 is used to interconnect a sprocket 26 and a sprocket 28. Sprocket 26 is attached to the shaft 21 by a conventional pin 27. Sprocket 28 is connected to motor 29 by conventional means. The motor 29 operates the sprocket and chain arrangement to drive the auger 11 in a direction necessary to move product from the input 31 through the frying chamber 12 to the outlet 22 of the chamber.

The shaft 21 has an enlarged portion 32 which is mounted within the discharge chamber 23. A paddle 33 is attached to this enlarged portion 32 and also to the last flight 34 of the auger 11. As the auger 11 is turned by the sprocket and motor system, the paddle 33 moves in a clockwise direction as viewed in FIGURES 2, 3, and 4. As product is augered from the chamber 12 by auger 11 into the discharge chamber 23, the paddle 33 which has apertures 36, sweeps through the oil in discharge chamber 23 and collects the fried material. It will be observed that since the paddle 33 is rigidly connected to lead 34 and to enlarged portion 32 of the shaft 21, that the paddle 33 will perform an unloading function once for each revolution of the auger 11. Discharge chamber 23 is preferably of larger diameter than chamber 12 to facilitate effective mounting and function of a scoop 38.

Also mounted to shaft 21 is a cam 37, illustrated in FIGURES 2, 3 and 4 which rotates with the auger 11 and auger shaft 21. This cam 37 is designed to actuate the unloading of fried product from the discharge chamber 23. FIGURE 2 of the drawings illustrates the discharge scoop 38 in the fully retracted position. Scoop 38 is preferably mounted above the oil level in the chamber 23 and this level is very near the top of chamber 12. If shaft 43, and therefore scoop 38, is so located this prevents oil from spilling from chamber 23. This also insures that the scoop 38 can be of sufficient size, when combined with an enlarged chamber 23 to promote efficient unloading the food product without loss due to damage of the product. In this position, the cam follower 39 engages cam 37 at a location on track 41 such that the scoop 38 is positioned to engage paddle 33 when it makes its clockwise swing. Follower 39 is connected to crank 42 which is rigidly connected to scoop 38 by a shaft 43 and brackets 44. A shaft 43 is pinned to the crank 42 and the brackets 44 so that clockwise movement of the crank arm 46 will produce clockwise motion of the scoop 38. A brace 47 is rigidly connected to frame 48 and is interconnected to crank 42 by a tension spring 49. Spring 49 is connected to arm 50 of the crank 42. The tension spring 49 tends to rotate the crank 42 in the counterclockwise direction so that cam follower 39 will stay in contact with track 41 of cam 37. This cooperation of elements causes the scoop 38 to be rotated clockwise to the fully disengaged position of the scoop 38 as illustrated in FIGURE 2.

As the cam 37 is rotated in the clockwise direction by the gear and sprocket system which operates the auger 11, the cam follower 39 rides along the track 41 and the arm 46 of the crank 42 is rotated in the clockwise direction. Since the scoop 38 is rigidly connected to the crank 42, the scoop 38 will likewise rotate in the clockwise direction as illustrated in FIGURE 3. This clockwise rotation permits the pickup end 51 of the scoop 38 to ride along the front face 52 of the paddle 33 to thereby pickup food product 54 which is moving in front of the paddle 33 as the paddle 33 moves in a clockwise direction through chamber 23. Track 41 of cam 37 is designed so that the pickup end 51 of scoop 38 just engages the surface 52 but does not jam with the surface or does not produce an acute angle therewith. If an acute angle were formed between the end 51 and a line along the length of the paddle 33, the two elements would become jammed and would not function.

As the cam 37 continues to rotate clockwise as viewed in FIGURES 3 and 4 of the drawings, the end 51 of scoop 38 continues up the front face 52 of the paddle 33. This sweeping action by the end 51 collects all of the product 54 which has been collected by the paddle 33. Also to facilitate efficient unloading, scoop 38 is formed with a semi-circular pocket 40 which permits product to drop from the face 52 of paddle 33 into the scoop 38. This prevents loss of product due to recirculation and breakage if the product has a tendency to remain with paddle 33.

As the follower 39 moves along track 41, the crank arm 46 moves in a clockwise direction thereby moving arm 50 in the clockwise direction. This rotation of the crank 42 moves the discharge end 56 in the clockwise direction or downward as viewed in FIGURES 3 and 4 of the drawings. The follower crank 42 moves against the tension of tension coil spring 49 which is secured to brace 47.

Refer now to FIGURE 4 of the drawings where the scoop 38 is shown in the discharge position. Product which is collected by end 51 of the scoop moves along the length of the scoop 38 and is discharged upon a conveyor 57. The cam follower 39 has moved the crank 42 clockwise as far as it will be moved. Further clockwise rotation of the cam 37 will result in counterclockwise rotation of the crank 42 and the scoop 38. The cam follower 39, as previously noted, is forced into contact with the face 41 of cam 37 by the tension spring 49 thereby rotating cam follower crank 42 in the counterclockwise direction. This, in turn, will return the scoop 38 from the unload position illustrated in FIGURE 4 to the position illustrated in FIGURE 2 of the drawings. At the unload position illustrated in FIGURE 4 of the drawings, the paddle 33 is permitted to pass beneath the scoop 39 in a new cycle of picking up a load of fried product. Thus, it will be observed that the chute 38 and the paddle 33 cooperate in a continuous loading and unloading cycle, once for each revolution of the auger 11. From this it will be observed that precise control is achieved of the length of time that food product remains in the frying chamber 12. The paddle 33 is constructed to be as wide as the discharge chamber 23 (note FIGURE 1 of the drawings). This results in complete pickup of all fried product discharged into the discharge chamber 23 by auger 11 on each complete revolution thereof. Therefore, no product is left in the oil to be overcooked and contaminate the oil and the precise residence time of the product in the oil is known and easily controlled by the rate of rotation of the auger 11.

FIGURE 5 illustrates an oil circulation system utilized in connection with the apparatus. Cold oil is removed from conduit 61 (see FIGURE 1 of the drawings) and is recycled by line 62 (see FIGURE 5 of the drawings), to a pump 63 which pumps the oil through a rate-of-flow meter 65 to a heater 64. Heater 64 returns the cool oil to a desired frying temperature. The cooled oil which is removed from the discharge chamber 23 of the deep fat fryer is filtered as it leaves the discharge chamber by a filter 66 to thereby reduce the number of tiny particles of food product left in the oil which may escape the paddle through apertures 36. The heated oil is pumped via line 67 through lines 68 and 69 back into the fryer chamber 12 where the product is cooked. New oil is introduced from tank 71 into line 62 to insure an adequate supply of oil in the system and to replace oil removed by the cooked food product. The oil flow from tank 71 is regulated by a flow level controller 72 which measures the oil level in the chamber 12 and thereby insures an optimum oil level which exactly fills the cooking chamber 12.

The outside walls 73 of the deep fat fryer are lined with fiber glass or similar insulation 74 in order to maintain a uniform oil temperature and to prevent heat loss in the oil. Also, an end wall 76 is provided which is likewise insulated to prevent heat loss. The discharge chamber which contains a relatively large quantity of oil also has an insulating jacket 77 designed to help maintain oil temperature and thereby reduce the need for excessive reheating of the oil in heater 64. The frame 78 of the deep fat fryer is connected by conventional means to the insulating jacket 77.

It is to be understood that the above identified arrangement and description of a preferred apparatus are simply illustrative of the application of the principles of the invention. Numerous other arrangements may be readily devised by those skilled in the art which will embody the principles of the invention and fall within the spirit and scope thereof.

Now, therefore, we claim:

1. A deep fat fryer which comprises a frame, a cylindrical fryer chamber forming an enclosed frying area for containing frying oil and having an inlet at one end and an outlet at the other end and mounted on said frame, a discharge chamber attached to the outlet end of said fryer chamber, an auger mounted within said fryer chamber and extending throughout the length of said fryer chamber along the central axis of said fryer chamber, said auger having a shaft which extends from said fryer chamber through and beyond said discharge chamber, said auger having flights which are of sufficiently large diameter to prevent food product from moving between the ends of the flight and the inside wall of said fryer chamber, power means connected to the auger shaft to rotate said auger to move food product through said fryer chamber from the inlet to the outlet and into said discharge chamber, a paddle mounted for rotation in said discharge chamber and connected to the auger lead nearest said discharge chamber for collecting fried food products in said discharge chamber, a cam attached for rotation to the portion of said auger shaft extending beyond said discharge chamber and scoop means actuated by said cam and mounted above and to one side of the axis of said auger shaft for collecting product from said paddle.

2. A fryer in accordance with claim 1 in which the discharge chamber is cylindrical in shape and of larger diameter than said fryer chamber.

3. A fryer in accordance with claim 2 in which said paddle extends along the radius of said discharge chamber from said auger shaft to the outside curved wall of said discharge chamber.

4. A fryer in accordance with claim 2 in which said cam has a track formed to activate said scoop means once for each revolution of said paddle.

5. A fryer in accordance with claim 1 in which said scoop means includes a scoop, a crank rigidly connected to said scoop, a cam follower connected to a first arm of said crank for engaging said cam and a tension spring interconnecting said frame and a second arm of said crank to force said follower in continuous contact with said cam.

6. A fryer in accordance with claim 5 in which said scoop has a semi-circular pocket in the end of the scoop nearest said paddle.

7. A fryer in accordance with claim 1 in which said scoop means is mounted above the oil level in said discharge chamber.

References Cited

UNITED STATES PATENTS

| | | | |
|---|---|---|---|
| 1,625,797 | 4/1927 | Deschenes | 99—407 |
| 2,585,293 | 2/1952 | Ashton | 99—404 |
| 2,643,603 | 6/1953 | Balluteen | 99—407 X |
| 2,732,789 | 1/1956 | Herberg | 99—404 |
| 3,086,444 | 4/1963 | Back | 99—404 X |

ROBERT W. JENKINS, *Primary Examiner.*